Nov. 13, 1951
H. H. MERWIN
2,575,062
REEL SPINDLE
Filed June 3, 1947
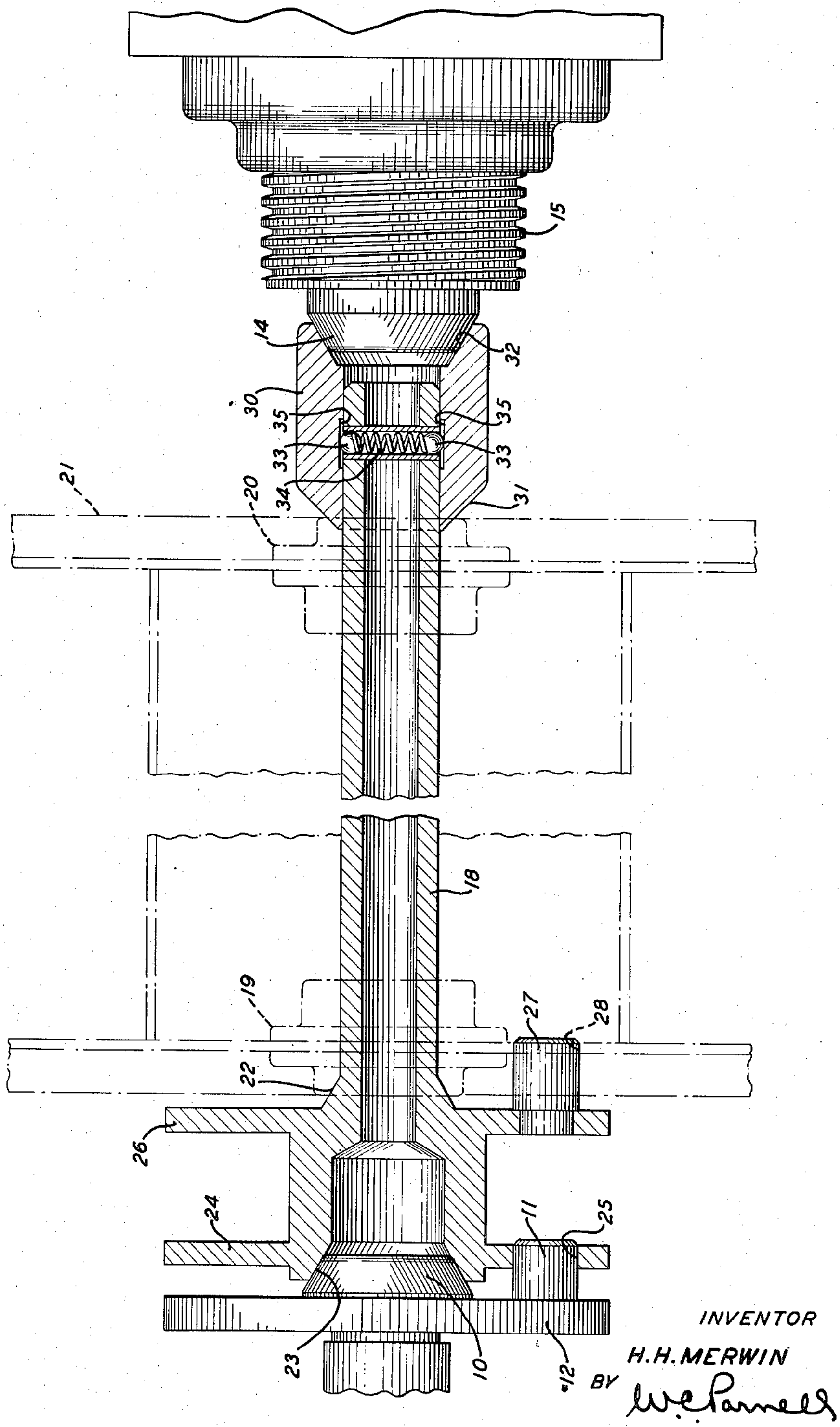
INVENTOR
H. H. MERWIN
BY W. C. Parnell
ATTORNEY Patented Nov. 13, 1951 2,575,062

UNITED STATES PATENT OFFICE 2,575,062

REEL SPINDLE

Harry H. Merwin, Rutherford, N. J., assignor to Western Electric Company, Incorporated, New York, N. Y., a corporation of New York Application June 3, 1947, Serial No. 752,204

1 Claim. (Cl. 242—134)

This invention relates to reel spindles and more particularly to spindles for supporting reels of a given size in a mechanism designed for larger reels.

In the art of manufacturing electrical conductors and cables, takeup mechanisms of the various machines are initially designed to receive takeup reels of given dimensions, particularly of given widths. In cable stranders, that is, machines for forming cables from pairs, or groups of pairs, of insulated electrical conductors, the takeup mechanism usually employs truncated cone centers to removably receive takeup reels of a given width. Heretofore such takeup mechanisms have been limited to the use of one size of takeup reel.

The object of the present invention is to condition such takeup mechanism to receive smaller reels by providing a reel spindle which may be readily mounted in the hub of a smaller reel and then mounted in a takeup mechanism initially designed for large reels.

Broadly, the invention comprises a reel spindle for use in a reel driving or takeup mechanism having a center to partially support and drive a reel of a given size, and a movable center to cause engagement of the centers with the hub of the reel to support the reel spindle. The spindle comprises a shaft receivable in the hub of a smaller reel and having a recess at one end thereof to receive the said drive center, a center member spaced from recesses to engage the adjacent hub of the smaller reel, and an element removably mounted on the other end of the shaft to engage the other hub of the smaller reel and also having a recess to be engaged by the movable center. In the takeup mechanism of machines such as cable stranders, the drive center is equipped with a drive pin receivable in an aperture of the larger reel to form a positive driving conection between the drive center and the reel.

In the present embodiment of the invention a flange on the shaft is provided with an aperture to receive the drive pin of the drive center. A second similar flange on the shaft carries a drive pin receivable in the aperture of the smaller reel to form a positive connection between the shaft and the smaller reel. The removable element mounted on the other end of the shaft is held against displacement by spring pressed ball members allowing axial movement of the element relative to the shaft between given limits for movement of the element into engagement with the adjacent hub of the reel by its connection with the movable center of the takeup mechanism.

Other objects and advantages will be apparent from the following detailed description when considered in conjunction with the accompanying drawing, the single figure of which shows a vertical sectional view of the reel spindle supported in a takeup mechanism of a cable strander.

Referring now to the drawing, the single figure discloses portions of a takeup mechanism of a cable strander to illustrate the invention. This mechanism includes a truncated cone center 10 which is driven about its axis in the conventional manner, not shown. A drive pin 11, supported by a flange 12, driven with the center 10, is positioned to be received in the standard aperture of the reel which may be described as the large reel for which the takeup mechanism was designed, thus forming a positive driving connection with the larger reel, not shown. A movable truncated cone center 14, supported by a threaded element 15 for movement axially toward or away from the center 10, is spaced from the drive center a given distance when in its open position to receive the larger reel.

The reel spindle was designed to support smaller reels singly in the takeup mechanism. The reel spindle includes a shaft 18 receivable in the hubs 19 and 20 of the smaller reel 21. A truncated cone center member 22 of the shaft 18 is receivable in the hub 19 while the truncated cone recess 23 in the adjacent end of the shaft 18 is formed to receive the drive center 10 of the takeup mechanism. A flange 24 integral with the shaft 18 has an aperture 25 to receive the drive pin 11 while a similar flange 26, spaced from the flange 24, carries a drive pin 27 receivable in an aperture 28 of the adjacent head of the reel 21.

A removable element 30 has a truncated cone center portion 31 receivable in the hub 20 and a truncated cone recess 32 in the outer end thereof to receive the movable center 14. The element 30 is held on the end of the shaft by ball members 33 mounted in the shaft 18 and urged outwardly by a spring 34. The ball members 33 are receivable in an annular groove 35 in the inner wall of the element 30, the groove being of a given width to allow axial movement of the element relative to the shaft between given limits.

When the reel spindle is to be put in use for the mounting of a smaller reel within the takeup mechanism, the empty reel 21 is conditioned for mounting in the takeup mechanism by positioning the shaft 18 within the hubs 19 and 20 of the reel and then placing the element 30 on the end of the shaft where it will be held in place by the ball members 33. The reel 21 together with the spindle may then be placed between the centers 10 and 14 of the takeup mechanism and the movable center 14 moved toward the center 10. During this movement of the center 14, the operator aligns the aperture 25 of the flange 24 with the drive pin 11. The aperture 28 on the reel 21 was positioned to receive the drive pin 27 when the reel spindle was mounted in the reel and prior to the mounting of the element 30 on the adjacent end of the shaft. The operator may continue the movement of the center 14 until the centers 10 and 14 are disposed sufficiently within their recesses 23 and 32 to support the reel spindle together with the reel 21.

The takeup mechanism may then be driven to rotate the reel spindle, through the connection of the drive pin 11 with the flange 24 and drive the reel 21 through its connection with the drive pin 27, until the reel is filled. The filled reel may be removed from the takeup mechanism in the conventional manner, which is usually by the aid of a hoist supporting the reel until the movable center 14 is opened, that is, moved to the right a sufficient distance to free the reel, and in this instance the reel spindle, from the truncated cone centers of the takeup mechanism. The reel 21 together with the reel spindle may then be removed from the takeup mechanism, after which the reel spindle may be readily removed from the full reel, first by removing the element 30 and then removing the shaft. The reel spindle may then be assembled in an empty reel.

Although specific improvements of the invention have been shown and described, it will be understood that they are but illustrative and that various modifications may be made therein without departing from the scope and spirit of this invention as defined by the appended claim.

What is claimed is:

A reel spindle comprising a shaft to extend through the hubs of a reel and having an enlarged end with a truncated cone recess therein to receive a truncated cone drive center of a supporting mechanism and an aperture spaced from the recess to receive a drive pin of the supporting mechanism which is fixed for rotation with the drive center, a pin carried by the enlarged end of the shaft to enter an aperture of the reel to form positive connection between the shaft and the reel, and an element removably mounted on the other end of the shaft, having a truncated cone shaped inner end to engage the adjacent hub of the reel and a truncated cone shaped recess in the outer end thereof to receive a movable truncated cone center of the supporting mechanism.

HARRY H. MERWIN.

REFERENCES CITED

The following references are of record in the file of this patent:

UNITED STATES PATENTS

| Number | Name | Date |
|---|---|---|
| 601,161 | Pain | Mar. 22, 1898 |
| 1,515,382 | Cheesman | Nov. 11, 1924 |
| 1,641,389 | Kroeger et al. | Sept. 6, 1927 |
| 1,692,458 | Mann et al. | Nov. 20, 1928 |
| 1,724,034 | Mayer | Aug. 13, 1929 |
| 1,789,481 | Stone | Jan. 20, 1931 |
| 1,884,183 | Pearson | Oct. 25, 1932 |
| 2,238,191 | Shelton | Apr. 15, 1941 |